United States Patent [19]

Boudot et al.

[11] 4,385,128

[45] May 24, 1983

[54] GERMANIUM-CONTAINING GLASS OF HIGH INFRARED TRANSMISSION AND LOW DENSITY

[75] Inventors: Jean E. Boudot; Jean P. Mazeau, both of Avon, France

[73] Assignee: Corning Glass Works, Corning, N.Y.

[21] Appl. No.: 335,647

[22] Filed: Dec. 30, 1981

[30] Foreign Application Priority Data

Feb. 11, 1981 [FR] France .................... 81 02692

[51] Int. Cl.³ .................... C03C 3/12; C03C 3/30
[52] U.S. Cl. .................... 501/42; 65/32; 65/134; 501/43; 501/904
[58] Field of Search ........... 501/42, 43, 904; 65/32, 65/134

[56] References Cited

U.S. PATENT DOCUMENTS

| | | | |
|---|---|---|---|
| 3,119,703 | 1/1964 | Cleek et al. | 501/42 |
| 3,531,305 | 9/1970 | Dumbaugh, Jr. | 501/42 |
| 3,745,032 | 7/1973 | Miller et al. | 501/42 |
| 3,769,047 | 10/1973 | Dumbaugh, Jr. | 501/42 |
| 3,911,275 | 10/1975 | Dumbaugh, Jr. | 501/42 X |

Primary Examiner—Richard V. Fisher
Attorney, Agent, or Firm—C. S. Janes, Jr.

[57] ABSTRACT

This invention is directed to the production of glasses having a density of less than 3.26 g/cm³, a $\beta_{OH}$ value less than 0.030 mm$^{-1}$, and, in a thickness of 2 mm, a transmission of at least about 80% at a wavelength of 4.0 microns and at least about 50% at a wavelength of 5 microns, which have base compositions within the alkali metal oxide-CaO-$Al_2O_3$-$GeO_2$-F and/or Cl field consisting essentially, expressed in terms of weight percent on the oxide basis, of

| | |
|---|---|
| $GeO_2$ | 36–55 |
| $Al_2O_3$ | 18–31 |
| CaO | 10–25 |
| $Li_2O$ | 0–5 |
| $K_2O$ and/or $Na_2O$ and/or $Li_2O$ | 7–20 |
| $Al_2O_3$ + 1.5 ($K_2O$ and/or $Na_2O$ and/or $Li_2O$) | ≧40 |
| F and/or Cl | 0.1–4. |

6 Claims, 2 Drawing Figures

GERMANIUM-CONTAINING GLASS OF HIGH INFRARED TRANSMISSION AND LOW DENSITY

BACKGROUND OF THE INVENTION

This invention is concerned with germanium-containing glasses demonstrating very good transmission properties in the infrared portion of the radiation spectrum and are of a relatively low density, along with the process for their manufacture. Glasses exhibiting good transmission of infrared radiation are widely used in both civilian and military applications.

Germanium-containing glasses which were designed for transmitting infrared radiation are known to the art. For example:

U.S. Pat. No. 3,119,703 discloses alkali metal-free glasses in the base composition system $BaO\text{-}TiO_2\text{-}GeO_2$. The glasses are asserted to transmit infrared radiation at wavelengths out to about six microns, to exhibit high deformation temperatures, to display good resistance to chemical attack, and to consist essentially, expressed in mole percent on the oxide basis, of

| | |
|---|---|
| $GeO_2$ | 35–45 |
| BaO | 18–22 |
| $TiO_2$ | 10–30 |
| $La_2O_3$ | 7 |
| $ZrO_2$ | 3–5 |
| $ThO_2$ | 0–3 |
| $Ta_2O_5$ | 0–1 |
| PbO | 0–2 |
| $WO_3$ | 0–2 |
| ZnO | 0–10 |
| $BaF_2$ | 0–4. |

U.S. Pat. No. 3,531,305 describes glasses in the base composition system $GeO_2\text{-}Al_2O_3\text{-}CaO$ exhibiting high transmittance at wavelengths between 5–6 microns. The glasses consist essentially, expressed in mole percent on the oxide basis, of

| | |
|---|---|
| $GeO_2$ | 33–42.5 |
| $Al_2O_3$ | 20–30 |
| CaO | 30–40 |
| $TiO_2$ and/or $La_2O_3$ and/or CdO and/or ZnO and/or BaO and/or SrO and/or MgO | 0–7. |

The patent also explains the importance of reducing the water content in the glass and teaches the preparation of glasses having low water contents via the addition of a chemically reactive, chlorine-containing agent to the batch, e.g., $CaCl_2$, and melting the batch in the presence of a dry atmosphere flowing directly over the glass melt. Thus, the "residual water" ($OH^-$ hydroxyl in content) must be minimized since it absorbs very strongly at a wavelength of about 2.9 microns.

U.S. Pat. No. 3,745,032 reveals glasses statedly transmitting about 80% of the infrared radiation at wavelengths out to 5.5 microns. The glasses consist essentially, expressed in mole percent on the oxide basis, of

| | |
|---|---|
| $GeO_2$ | 40–80 |
| CaO | 1–15 |
| ZnO | 2–10 |
| $ZrO_2$ | 1–10 |
| MgO | 5–16 |
| $K_2O$ and/or $Na_2O$ | 1–10 |
| $Al_2O_3$ | 0–15. |

U.S. Pat. No. 3,769,047 discusses glasses manifesting excellent transmittance of infrared radiation out to 5.5 microns and which evidence good abrasion resistance and low liquidus temperatures, the latter feature greatly improving the melting and forming characteristics of the glass. The glasses consist essentially, expressed in weight percent on the oxide basis, of

| | |
|---|---|
| $GeO_2$ | 25–50 |
| $Al_2O_3$ | 1.5–25 |
| $La_2O_3$ | 15–40 |
| $Nb_2O_5$ and/or $Ta_2O_5$ and/or SrO and/or BaO and/or PbO and/or ZnO | 2.5–45. |

U.S. Pat. No. 3,911,275 discloses infrared transmitting glasses of high abrasion resistance and having a relatively low coefficient of thermal expansion. The glasses consist essentially, expressed in weight percent on the oxide basis, of

| | |
|---|---|
| $GeO_2$ | 25–50 |
| $La_2O_3$ | 10–50 |
| $Ta_2O_5$ | 5–50 |
| ZnO | 2–20 |
| $Nb_2O_5$ | 0–40 |
| $Al_2O_3$ | 0–5 |
| $ZrO_2$ | 0–5 |
| PbO | 0–20. |

However, the glasses described in those patents have generally had a relatively high density, viz., greater than about 3.31 g/cm³. For some applications, e.g., the fabrication of windows for missiles, there has been a need for light weight glasses exhibiting a high degree of infrared transmission, especially at wavelengths between 3.5–5 microns. Low density, infrared transmitting glasses have been marketed commercially but such have generally demonstrated a transmission of no more than about 50% at a wavelength of 4.4 microns in a thickness of 2 mm.

SUMMARY OF THE INVENTION

The primary objective of the instant invention is to produce glasses having a relatively low density, viz., less than 3.26 g/cm³, and high transmission of radiation over the range of wavelengths 3.5–5 microns, viz., at least about 50% at 5 microns and at least about 80% at 4.0 microns in a thickness of 2 mm. That objective can be achieved with glasses in the alkali metal oxide-CaO-$Al_2O_3$-$GeO_2$-F and/or Cl system consisting essentially, expressed in terms of weight percent on the oxide basis, of about

| | |
|---|---|
| $GeO_2$ | 36–55 |
| $Al_2O_3$ | 18–31 |
| CaO | 10–25 |
| $Li_2O$ | 0–5 |
| $K_2O$ and/or $Na_2O$ and/or $Li_2O$ | 7–20 |
| $Al_2O_3$ + 1.5 ($K_2O$ and/or $Na_2O$ and/or $Li_2O$) | ≧40 |
| F and/or Cl | 0.1–4. |

The more preferred compositions consist essentially of

| | |
|---|---|
| GeO₂ | 40–50 |
| Al₂O₃ | 22–28 |
| CaO | 12–17 |
| Li₂O | 0–5 |
| K₂O and/or Na₂O and/or Li₂O | 11–17 |
| Al₂O₃ + 1.5 (K₂O and/or Na₂O and/or Li₂O) | ≧40 |
| F | 0.3–3 . |

It should be observed that, without significantly affecting the infrared transmission properties of the inventive glasses, CaO can be replaced in part, particularly when the base composition is selected from within the preferred range, by up to 4% by weight of at least one oxide chosen from the group of MgO, ZnO, and ZrO₂, up to 6% by weight of at least one oxide chosen from the group of TiO₂, PbO, CdO, La₂O₃, Nb₂O₅, Ta₂O₅, Y₂O₃, and Gd₂O₃, up to 8% BaO, and up to 10% SrO. If several of those optional oxides are admixed to replace CaO, it is preferred that the total of all the substituting oxides does not exceed 10% by weight, preferably not more than 6% by weight when MgO and/or ZnO and/or ZrO₂ are present, in order not to increase the tendency toward devitrification and raising the liquidus temperature. SrO may totally replace CaO at the 10% level but such practice hazards devitrification and the inclusion of some CaO is quite preferable. CaO must be present in an amount of at least 4.5%, however, where the other optional oxides are substituted for CaO. In addition, it should also be noted that, with the exception of TiO₂ and MgO which do not significantly affect the density of the glass when substituted for CaO, all of the other oxides increase glass density. Consequently, the admissible quantity for those substitutions for CaO also depends upon the density of the base glass selected so as not to exceed the limit of 3.26 g/cm³. Table I below illustrates the effect exerted on the density of a glass (expressed in terms of g/cm³) through the substitution of 1% of the above-mentioned oxides for 1% of CaO. The table makes possible the rough determination of the maximum admissible quantity of an oxide or oxides that can be utilized.

TABLE I

| Substituting Oxide | Variation in Density |
|---|---|
| Nb₂O₅ | +0.004 |
| SrO, ZnO | +0.008 |
| BaO | +0.009 |
| CdO, La₂O₃ | +0.010 |
| Y₂O₃ | +0.011 |
| ZrO₂ | +0.12 |
| Ta₂O₅ | +0.15 |
| PbO, Gd₂O₃ | +0.017 |

The inventive glasses are transparent in the visible range of the radiation spectrum and, at ambient temperature and a thickness of 2 mm, display a transmission of at least about 80% over the range of wavelengths of 3.5–4.25 microns and at least about 50% at 5 microns. However, most of the inventive glasses, and particularly the preferred glasses in a thickness of 2 mm, exhibit a transmission of at least 84% over the range of 3.5–4 microns, at least 80% at 4.5 microns, and at least 58% at 5 microns. The transmission properties vary only slightly when the glasses are heated to temperatures up to 300° C.

Furthermore, the inventive glasses have a very low "residual water" value, as expressed by the coefficient of absorption $\beta_{OH}$ defined by the following formula:

$$\beta_{OH} = \frac{1}{e} \log \frac{T_{2.6}}{T_{2.9\ to\ 3.0}}$$

where
  $e$ = thickness of the sample in mm.
  $T_{2.6}$ = transmission in % at a wavelength of 2.6 microns (maximum transmission)
  $T_{2.9\ to\ 3.0}$ = transmission in % at the wavelength for which the absorption due to the residual water (OH⁻) is maximum. For the inventive glasses this wavelength is between 2.9–3.0 microns.

The minimum transmission characteristics cited above for the inventive glasses are easily satisfied when the value of $\beta_{OH}$ is less than 0.03 mm⁻¹. In most instances the inventive glasses have a $\beta_{OH}$ of less than 0.02 mm⁻¹.

The above-defined compositional limits are important not only for obtaining a glass of low density, but also to insure good glass stability, to impart good melting properties thereto, and to confer good resistance to weathering. In the base inventive glasses GeO₂ and CaO contribute most, in approximately an equal manner, to an increase in glass density. Nevertheless, those components must be maintained at sufficiently high levels to achieve a good compromise between infrared transmission and ease of manufacturing the glass (low tendency to devitrify during melting and forming). When CaO is present in the glass outside of the prescribed range, the liquidus temperature rises rapidly, especially when the Al₂O₃ content is high. Al₂O₃ levels above 31% increase the viscosity of the glass excessively and values of the alkali metal oxides below the specified minimum lead to high liquidus temperatures and rates of devitrification. Where the Al₂O₃ is less than 18%, the alkali metal content must be in excess of about 15.5% in order to maintain a glass density below 3.26 g/cm³. Such a combination results in a deterioration of the resistance to chemical attack demonstrated by the glass. The alkali metal oxides contribute in roughly the same manner to glass density irrespective of identity. Levels of alkali metal oxides above 20% cause a rapid decrease in weathering resistance. With regard to this latter property, K₂O is preferable to Na₂O and Li₂O on a weight percent basis.

Production of the inventive glasses to have a $\beta_{OH}$ value less than 0.03 mm⁻¹ requires the use of special measures. The operable procedure consists of maintaining the surface of molten glass under a dry gas atmosphere and bubbling dry gas through the molten mass. The identity of the dry gas is not critical so long as it is compatible with the material of the melting unit in which the glass is prepared, e.g., platinum. To illustrate, the use of oxygen has yielded good results with the inventive glasses. Preferably, a current of dry gas flowing directly over the molten glass surface comprises the dry gas atmosphere. A second feature of the operable process includes mixing the ingredients of the initial batch with a quantity of a fluorine-containing and/or chlorine-containing compound corresponding to 1–4% by weight F⁻ or 2–5% by weight Cl⁻. An amount corresponding to at least 1% F⁻ or 2% Cl⁻ is demanded for good efficiency but F⁻ contents in excess of 4% or Cl⁻ contents in excess of 5% offer no additional advantage and may adversely alter the stability of the glass. The most desirable results occur with F⁻ levels of approximately 2% and Cl⁻ values of approximately 3%. The use of F⁻ is preferred to that of Cl⁻. In addition to their reducing the "residual water" content of the glass, those elements contribute to lowering the viscosity thereof which can facilitate their production.

It is believed that the F⁻ and/or Cl⁻ ions play the role of a "drying" agent during the melting of the glass. It has been postulated that this action is the result of several reactions taking place at the melting temperature including the replacement of OH⁻ ions which are bound to the germanium with F⁻ and/or Cl⁻ ions, accompanied with the liberation of $H_2O$ and the formation and vaporization of HF and/or HCl.

A portion of the F⁻ and/or Cl⁻ ions is eliminated during glass production and, therefore, only a reduced amount remains in the final glass when compared to the quantity included in the initial batch. The amount of residual ions depends in large part upon the melting conditions. Most frequently, about 0.3-3% F⁻ and/or Cl⁻ will remain in the glass.

The inventive glasses will be essentially free from such glass forming oxides as $SiO_2$, $B_2O_3$, and $P_2O_5$.

PRIOR ART

U.S. Pat. Nos. 3,119,703, 3,531,305, 3,769,047, and 3,911,275 discussed above describe infrared transmitting glass compositions which are free from alkali metal oxides. U.S. Pat. No. 3,745,032 discloses $GeO_2$-containing glasses wherein $Na_2O$ and/or $K_2O$ are required components. However, the maximum $Al_2O_3$ content optionally permitted in that patent is less than the minimum demanded in the inventive glasses. Furthermore, the sum of the $Al_2O_3$ content plus 1.5 ($K_2O+Na_2O+Li_2O$) is less than 40%. Finally there is no teaching therein of the use of fluoride and/or chloride containing compounds to dry the glasses.

DESCRIPTION OF THE PREFERRED EMBODIMENTS

Preparation of the initial batches for producing the inventive glasses is carried out in the conventional manner. In the following exemplary compositions, expressed in terms of parts by weight on the oxide basis as calculated from the batch, the batch ingredients employed were $GeO_2$, calcined $Al_2O_3$, $CaCO_3$, and alkali metal carbonates. The use of hydrated raw materials such as $Al(OH)_3$ should be avoided. The F⁻ and/or Cl⁻ ions were introduced in the form of such fluoride-containing and chloride-containing compounds as $CaF_2$, $CaCl_2$, $SrF_2$, $AlF_3$, etc. Because it is not known with which cation(s) the fluoride or chloride ions are combined, they are simply reported as fluoride and chloride, in accordance with conventional glass analysis practice. Also, because the sum of the individual batch ingredients totals approximately 100, for all practical purposes the values may be deemed to reflect weight percent.

The batch, representing several kilograms of glass, was melted in a platinum crucible at temperatures ranging from 1300°-1660° C. Bubbling of dry gas through the melt is undertaken after the melting of the batch is complete; a refining step, without bubbling, precedes the forming of the melt into a glass shape. The inventive glasses were shaped into bars, discs, or pressed articles where were subsequently annealed in an annealing furnace operating at approximately 550°-750° C. The combination of melting in a dry atmosphere (bubbling and protection of the glass surface), coupled with the use of fluoride and/or chloride-containing compounds, makes it possible to obtain values of $\beta_{OH}$ as low as 0.005 mm⁻¹ and always less than 0.03 mm⁻¹.

The inventive glasses may readily be cut and polished utilizing conventional techniques. They may also be given surface treatments, e.g., anti-reflecting layers applied to increase transmission, in the customary fashion without problems. Those layers (generally $MgF_2$) offer the additional advantage of significantly increasing the weathering resistance of the glasses. Such treatments are preferably undertaken immediately after the polishing step.

The following working examples are provided by way of illustration, not limitation. Tables IIA and IIB recite several compositions operable in the invention, along with some density (g/cm³) measurements. Other properties such as $\beta_{OH}$, and % transmission measurements at 2 mm and 4 mm thicknesses were determined in Table IIA. Table III reports a number of additional physical properties for Examples 1 and 2, which compositions are particularly desirable because of their density and manufacturability.

Figure 1:
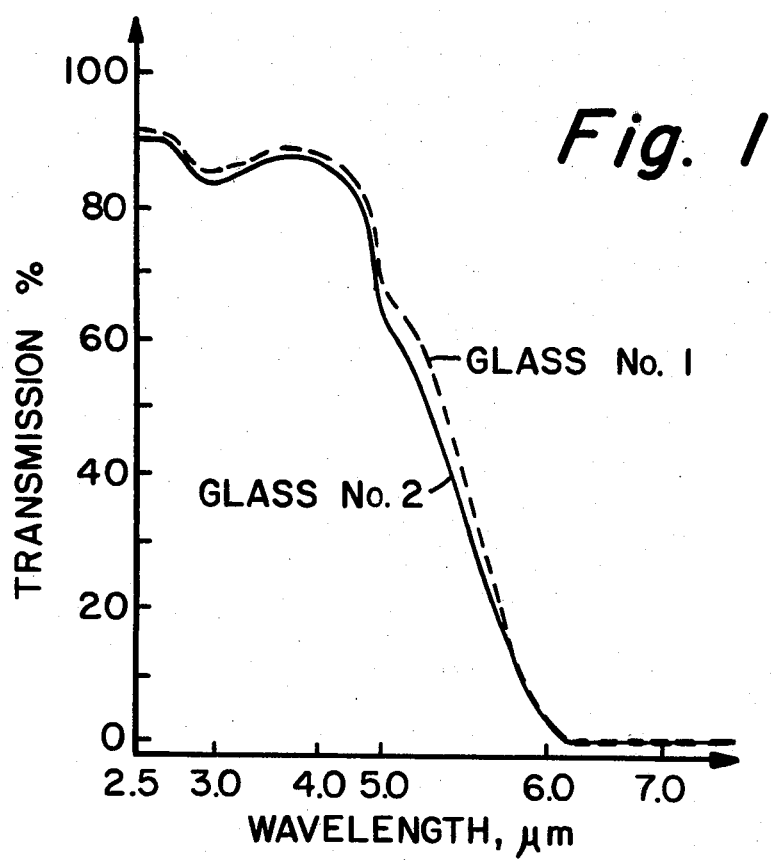
FIG. 1 depicts infrared transmission curves for two exemplary compositions of the invention.

FIG. 1 depicts transmission curves for plates of Examples 1 and 2 of 2 mm thickness.

Figure 2:
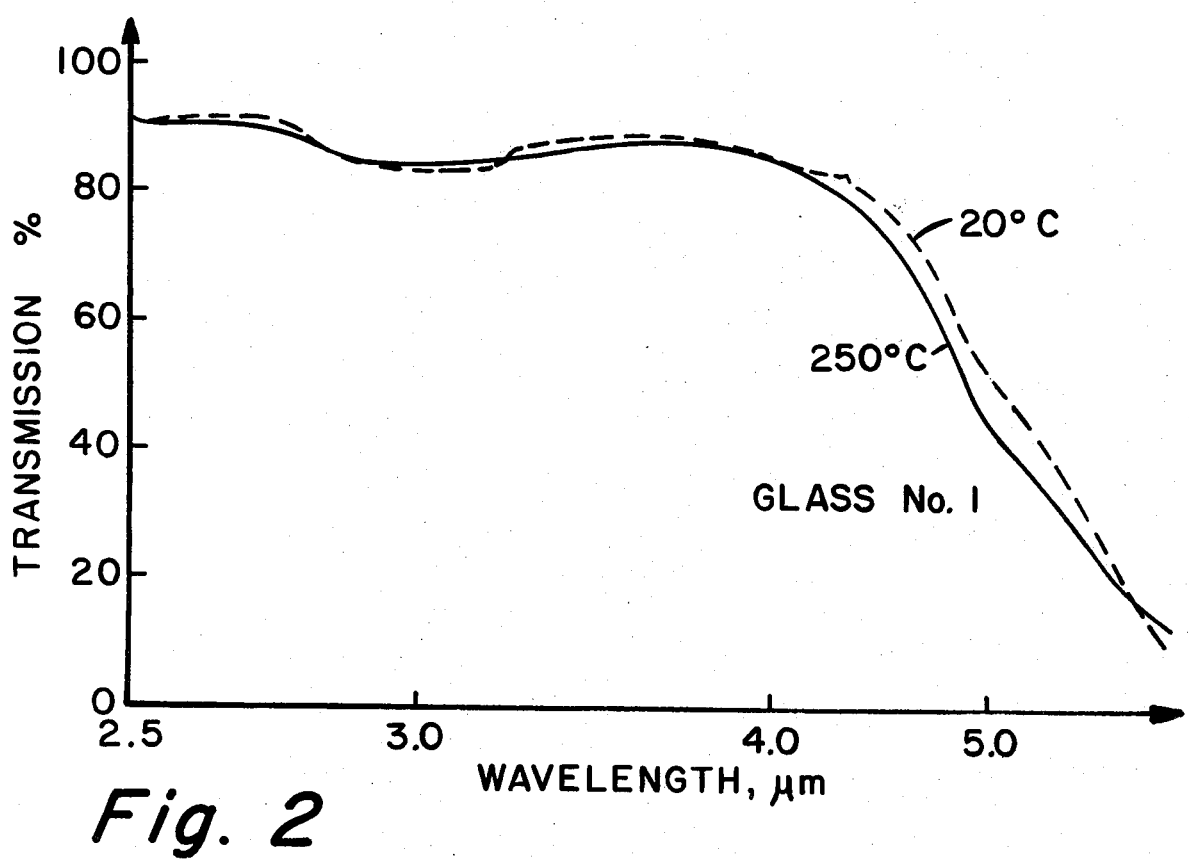
FIG. 2 represents infrared transmission curves for an exemplary composition of the invention at different temperatures.

FIG. 2 illustrates the variation in transmission exhibited by plates of Example 1 in a thickness of 4 mm as a function of temperature. It will be observed in FIG. 2 that, in 4 mm thickness, Example 1 demonstrates a variation in transmission of less than 1% over the temperature range of 20°-250° C.

It will, of course, be appreciated that the method embodiments described above are illustrative only and that it would be possible to modify them, especially by substituting equivalent techniques, without thereby exceeding the scope of the invention.

TABLE IIA

|  | 1 | 2 | 3 | 4 | 5 | 6 | 7 | 8 | 9 |
|---|---|---|---|---|---|---|---|---|---|
| $GeO_2$ | 45.3 | 45.3 | 45.3 | 45.3 | 45.3 | 45.3 | 45.3 | 45.3 | 49.7 |
| $Al_2O_3$ | 24.9 | 24.9 | 24.9 | 24.9 | 24.9 | 24.9 | 24.9 | 24.9 | 24.9 |
| $Na_2O$ | 15.4 | — | — | — | — | — | 15.4 | 11.4 | — |
| $K_2O$ | — | 15.4 | 15.4 | 15.4 | 19.4 | 15.4 | — | — | 15.4 |
| MgO | — | — | — | 3.0 | — | — | — | 4.0 | — |
| CaO | 14.4 | 14.4 | 14.4 | 11.4 | 10.4 | 8.4 | 10.4 | 14.4 | 10.0 |
| $ZrO_2$ | — | — | — | — | — | — | 4.0 | — | — |
| $TiO_2$ | — | — | — | — | — | 6.0 | — | — | — |
| F | 2.0 | 2.0 | — | 2.0 | 2.0 | 2.0 | 2.0 | 2.0 | 2.0 |
| Cl | — | — | 3.0 | — | — | — | — | — | — |
| Density | 3.18 | 3.18 | 3.18 | 3.18 | 3.12 | 3.16 | 3.23 | 3.24 | 3.17 |

TABLE IIA-continued

|   | 1 | 2 | 3 | 4 | 5 | 6 | 7 | 8 | 9 |
|---|---|---|---|---|---|---|---|---|---|
| $\beta_{OH}$ (mm$^{-1}$) | 0.013 | 0.017 | 0.020 | 0.005 | 0.020 | 0.006 | 0.027 | 0.016 | 0.013 |
| Trans. 4 mm | | | | | | | | | |
| 4 microns | 84 | 84 | 84 | 84 | 83 | 84.5 | 83.5 | 83 | — |
| 4.5 microns | 76.5 | 76.5 | 77 | 77.5 | 76 | 75.5 | 75 | 76 | — |
| 5 microns | 52 | 48.5 | 51 | 46.5 | 45 | 41.5 | 48 | 56 | — |
| Trans. 2 mm | | | | | | | | | |
| 4 microns | 87 | 86.5 | — | — | 87.5 | 87.5 | — | — | 87 |
| 4.5 microns | 84 | 83 | — | — | 84.5 | 83 | — | — | 82 |
| 5 microns | 69 | 66 | — | — | 65 | 62 | — | — | 61.5 |

TABLE IIB

|   | 10 | 11 | 12 | 13 | 14 | 15 | 16 | 17 | 18 |
|---|----|----|----|----|----|----|----|----|-----|
| GeO$_2$ | 45.3 | 45.3 | 45.3 | 39.3 | 45.3 | 45.3 | 45.3 | 51.3 | 50.0 |
| Al$_2$O$_3$ | 24.9 | 24.9 | 24.9 | 30.9 | 21.9 | 24.9 | 24.9 | 18.9 | 30.0 |
| Li$_2$O | — | — | — | — | — | 5.0 | — | — | — |
| K$_2$O | 15.4 | 15.4 | 15.4 | 15.4 | 15.4 | 10.4 | 15.4 | 15.4 | 10.0 |
| CaO | 8.4 | 10.4 | 6.4 | 14.4 | 14.4 | 14.4 | 4.9 | 14.4 | 10.0 |
| BaO | — | — | 8.0 | — | — | — | — | — | — |
| SrO | — | — | — | — | — | — | 9.5 | — | — |
| ZnO | — | 4 | — | — | — | — | — | — | — |
| La$_2$O$_3$ | 6.0 | — | — | — | — | — | — | — | — |
| TiO$_2$ | — | — | — | — | 3.0 | — | — | — | — |
| F | 2.0 | 2.0 | 2.0 | 2.0 | 2.0 | 2.0 | 2.0 | 2.0 | 2.0 |
| Density | 3.24 | 3.21 | 3.25 | 3.11 | 3.21 | 3.17 | 3.25 | 3.25 | 3.23 |

TABLE III

|   | 1 | 2 |
|---|---|---|
| Softening Point (°C.) | 584 | 695 |
| Coefficient of Thermal Expansion (25°–300° C.) | 102 × 10$^{-7}$/°C. | 85.4 × 10$^{-7}$/°C. |
| Young's Modulus, MPa | 79850 | 75440 |
| Shear Modulus, MPa | 31500 | 29780 |
| Poisson's Ratio | 0.266 | 0.270 |
| Fracture Strength, MPa | 32.3 ($\sigma = 2.0$) | 32.6 ($\sigma = 2.2$) |
| Knoop hardness (KH$_{200}$) | 467 | 495 |
| Refractive Index at 4.25 microns | 1.5474 | — |
| Refractive Index at 1.014 microns | 1.5904 | 1.5925 |

We claim:

1. A glass having a density less than 3.26 g/cm$^3$, a $\beta_{OH}$ value less than 0.03 mm$^{-1}$, and, in a thickness of 2 mm, a transmission of at least about 80% at a wavelength of 4.0 microns and at least about 50% at a wavelength of 5 microns, which consists essentially, expressed in terms of weight percent on the oxide basis, of

| | |
|---|---|
| GeO$_2$ | 36–55% |
| Al$_2$O$_3$ | 18–31% |
| CaO | 0–25% |
| Li$_2$O | 0–5% |
| K$_2$O and/or Na$_2$O and/or Li$_2$O | 7–20% |
| Al$_2$O$_3$ + 1.5 (K$_2$O and/or Na$_2$O and/or Li$_2$O) | ≧40% |
| F and/or Cl | 0.1–4% |
| MgO and/or ZnO and/or ZrO$_2$ | 0–4% |
| TiO$_2$ and/or PbO and/or CdO and/or La$_2$O$_3$ and/or Nb$_2$O$_5$ and/or Ta$_2$O$_5$ and/or Y$_2$O$_3$ and/or Gd$_2$O$_3$ | 0–6% |
| BaO | 0–8% |
| SrO | 0–10% |
| MgO + ZnO + ZrO$_2$ + TiO$_2$ + PbO + CdO + La$_2$O$_3$ + Nb$_2$O$_5$ + Ta$_2$O$_5$ + Y$_2$O$_3$ + Gd$_2$O$_3$ + BaO + SrO | 0–10% |
| CaO + SrO or at least 4.5% CaO + MgO + ZnO + ZrO$_2$ + TiO$_2$ + PbO + CdO + La$_2$O$_3$ + Nb$_2$O$_5$ + Ta$_2$O$_5$ + Y$_2$O$_3$ + Gd$_2$O$_3$ + BaO | 10–25% |

2. A glass according to claim 1 consisting essentially of

| | |
|---|---|
| GeO$_2$ | 36–55% |
| Al$_2$O$_3$ | 18–31% |
| CaO | 10–25% |
| Li$_2$O | 0–5% |
| K$_2$O and/or Na$_2$O and/or Li$_2$O | 7–20% |
| Al$_2$O$_3$ + 1.5 (K$_2$O and/or Na$_2$O and/or Li$_2$O) | ≧40% |
| F and/or Cl | 0.1–4% |

3. A glass according to claim 2 consisting essentially of

| | |
|---|---|
| GeO$_2$ | 40–50% |
| Al$_2$O$_3$ | 22–28% |
| CaO | 12–17% |
| Li$_2$O | 0–5% |
| K$_2$O and/or Na$_2$O and/or Li$_2$O | 11–17% |
| Al$_2$O$_3$ + 1.5 (K$_2$O and/or Na$_2$O and/or Li$_2$O) | ≧40% |
| F | 0.3–3% |

4. A method for making a glass having a density less than 3.26 g/cm$^3$, a $\beta_{OH}$ value less than 0.03 mm$^{-1}$, and, in a thickness of 2 mm, a transmission of at least about 80% at a wavelength of 4.0 microns and at least about 50% at a wavelength of 5 microns, which comprises the steps of:

(a) preparing and mixing a batch to yield a glass consisting essentially, expressed in terms of weight percent on the oxide basis, of

| | |
|---|---|
| GeO$_2$ | 36–55% |
| Al$_2$O$_3$ | 18–31% |
| CaO | 0–25% |
| Li$_2$O | 0–5% |
| K$_2$O and/or Na$_2$O and/or Li$_2$O | 7–20% |
| Al$_2$O$_3$ + 1.5 (K$_2$O and/or Na$_2$O and/or Li$_2$O) | ≧40% |
| F and/or Cl | 0.1–4% |
| MgO and/or ZnO and/or ZrO$_2$ | 0–4% |
| TiO$_2$ and/or PbO and/or CdO and/or La$_2$O$_3$ and/or Nb$_2$O$_5$ and/or Ta$_2$O$_5$ and/or Y$_2$O$_3$ and/or Gd$_2$O$_3$ | 0–6% |
| BaO | 0–8% |
| SrO | 0–10% |
| MgO + ZnO + ZrO$_2$ + TiO$_2$ + PbO + CdO + La$_2$O$_3$ + Nb$_2$O$_5$ + Ta$_2$O$_5$ + Y$_2$O$_3$ + Gd$_2$O$_3$ + BaO + SrO | 0–10% |
| CaO + SrO or at least 4.5% CaO + MgO + ZnO + ZrO$_2$ + TiO$_2$ + PbO + CdO + La$_2$O$_3$ + Nb$_2$O$_5$ + Ta$_2$O$_5$ + Y$_2$O$_3$ + Gd$_2$O$_3$ + BaO | 10–25% | wherein F and/or Cl are incorporated into said batch as a fluorine and/or chlorine-containing compound in an amount equal to 1–4% F and/or 2–5% Cl;

(b) melting said batch while maintaining a dry gas atmosphere on the surface of the melt and bubbling a dry gas through the melt; and then (c) forming said melt into a glass article.

5. A method according to claim 4 wherein said glass consists essentially of

| | |
|---|---|
| $GeO_2$ | 36–55% |
| $Al_2O_3$ | 18–31% |
| CaO | 10–25% |
| $Li_2O$ | 0–5% |
| $K_2O$ and/or $Na_2O$ and/or $Li_2O$ | 7–20% |
| $Al_2O_3$ + 1.5 ($K_2O$ and/or $Na_2O$ and/or $Li_2O$) | ≧40% |

-continued

| | |
|---|---|
| F and/or Cl | 0.1–4%. |

6. A method according to claim 5 wherein said glass consists essentially of

| | |
|---|---|
| $GeO_2$ | 40–50% |
| $Al_2O_3$ | 22–28% |
| CaO | 12–17% |
| $Li_2O$ | 0–5% |
| $K_2O$ and/or $Na_2O$ and/or $Li_2O$ | 11–17% |
| $Al_2O_3$ + 1.5 ($K_2O$ and/or $Na_2O$ and/or $Li_2O$) | ≧40% |
| F | 0.3–3%. |

* * * * *